United States Patent
Pesonen et al.

(10) Patent No.: US 10,542,370 B2
(45) Date of Patent: Jan. 21, 2020

(54) MANAGEMENT OF A VIRTUAL SPACE

(71) Applicant: Rovio Entertainment Ltd, Espoo (FI)

(72) Inventors: Mika Pesonen, Espoo (FI); Johannes Rajala, Espoo (FI)

(73) Assignee: ROVIO ENTERTAINMENT LTD, Espoo (FI)

( * ) Notice: Subject to any disclaimer, the term of this patent is extended or adjusted under 35 U.S.C. 154(b) by 464 days.

(21) Appl. No.: 14/340,607

(22) Filed: Jul. 25, 2014

(65) Prior Publication Data

US 2016/0026705 A1  Jan. 28, 2016

(51) Int. Cl.
  *G06F 17/30* (2006.01)
  *H04W 4/02* (2018.01)
  *H04W 4/029* (2018.01)

(52) U.S. Cl.
  CPC ............ *H04W 4/02* (2013.01); *H04W 4/029* (2018.02)

(58) Field of Classification Search
  None
  See application file for complete search history.

(56) References Cited

U.S. PATENT DOCUMENTS

| | | | |
|---|---|---|---|
| 2005/0186884 A1 | 8/2005 | Evans | |
| 2008/0280682 A1 | 11/2008 | Brunner et al. | |
| 2009/0192709 A1* | 7/2009 | Yonker | H04W 4/029 701/470 |
| 2011/0140849 A1* | 6/2011 | Matus | G01S 5/0027 340/8.1 |
| 2011/0250967 A1 | 10/2011 | Kulas | |
| 2012/0056717 A1* | 3/2012 | Maharbiz | A63F 3/00214 340/8.1 |
| 2014/0004885 A1 | 1/2014 | Demaine | |
| 2014/0247279 A1* | 9/2014 | Nicholas | G06T 19/006 345/633 |
| 2014/0292807 A1* | 10/2014 | Raffa | G06T 19/006 345/633 |
| 2014/0364227 A1* | 12/2014 | Langlois | A63F 13/00 463/32 |
| 2015/0035858 A1* | 2/2015 | Yang | G01C 21/206 345/629 |

(Continued)

FOREIGN PATENT DOCUMENTS

EP  2 602 677 A1  6/2013

OTHER PUBLICATIONS

Teoh Chee Hooi et al., "Enhanced Fusion Hybrid (FH+) Architecture for Indoor and Outdoor Victim Localization", IEEE 2013, Tencon—Spring, pp. 510-514.

*Primary Examiner* — Taelor Kim
*Assistant Examiner* — Eddy Cheung
(74) *Attorney, Agent, or Firm* — Squire Patton Boggs (US) LLP

(57) ABSTRACT

According to an example embodiment of the present invention, there is provided an apparatus comprising at least one receiver configured to receive sensor information and indoor positioning information, at least one processing core configured to select information from a group comprising the sensor information and the indoor positioning information based at least in part on a determination concerning the sensor information, and at least one transmitter configured to cause transmission of either the selected information, or of information derived from the selected information.

12 Claims, 6 Drawing Sheets

(56) References Cited

U.S. PATENT DOCUMENTS

2015/0172871 A1* 6/2015 Yang .................... G01C 21/206
  455/456.3
2015/0221135 A1* 8/2015 Hill ....................... H04W 4/026
  345/633

* cited by examiner

MANAGEMENT OF A VIRTUAL SPACE

FIELD OF INVENTION

The present invention relates to data management, such as management of data via a virtual space.

BACKGROUND OF INVENTION

Maps record geographical or urban features of a landscape, and can be conveniently printed on paper which may be folded to a compact size for easy portability and reference. In other words, features in maps correspond to features in terrain via a mapping. Such a mapping may comprise a scale. By consulting a map a person is enabled to discover aspects of her surroundings that may not be obvious by surveying the surroundings visually. Examples of such aspects may include elevation, nearby buildings, nearby streets, public transport connections and municipal or international borders.

Industrial plants may be mapped to a functional map, such that the functional map comprises features that are relevant to an industrial process run in the plant. In detail, the functional map may have represented therein process phases in such a way that a skilled person consulting the functional map can learn features of the process. A functional map may have active components, such as warning lights and/or audible warning signals, arranged to provide dynamic information of current process parameters, such as temperature and/or pressure, for example.

Interacting with data may be accomplished via an operating system, such as the Linux operating system, wherein a user may input, using a keyboard, textual commands into a command window displayed on a screen device. Responsive to the textual commands, the operating system may perform operations on data, which may be stored on data files. For example, data files may be copied, moved, archived or compressed in dependence of the textual commands input by the user.

Some operating systems, such as Windows, feature a virtual desktop with icons representing programs, files and folders. Using a pointing device, such as for example a computer mouse, a user may activate, delete or move the icons to cause the operating system to take actions the user wishes. Operating systems may provide audio signals, such as beeps, to communicate to users, for example of error conditions.

SUMMARY OF THE INVENTION

According to a first aspect of the present invention, there is provided an apparatus comprising at least one receiver configured to receive sensor information and indoor positioning information, at least one processing core configured to select information from a group comprising the sensor information and the indoor positioning information based at least in part on a determination concerning the sensor information, and at least one transmitter configured to cause transmission of either the selected information, or of information derived from the selected information.

Various embodiments of the first aspect may comprise at least one feature from the following bulleted list:
the sensor information comprises at least one of: camera information, barcode reader information and near field communication information
the indoor positioning information comprises information concerning electromagnetic measurements in an indoor space
the at least one receiver is further configured to receive global positioning information, the group further comprises the global positioning information and the at least one processing core is configured to select the information based at least in part on a determination concerning the indoor positioning information
the global positioning information comprises satellite positioning information
the at least one processing core is configured to determine that a smart object is associated with the apparatus, and the at least one transmitter is configured to cause transmission of information concerning the smart object
the at least one transmitter is configured to cause transmission of either the selected information, or of the information derived from the selected information, to a node maintaining a virtual space
the information derived from the sensor information comprises at least one of a location and an orientation of the apparatus on a physical surface
the determination concerning the sensor information comprises a determination as to whether the apparatus is disposed on a physical surface, and responsive to a determination the apparatus is disposed on the physical surface, the at least one processing core is configured to select the sensor information
responsive to a determination the apparatus is not disposed on the physical surface, the at least one processing core is configured to select the indoor positioning information According to a second aspect of the present invention, there is provided an apparatus comprising at least one processing core, at least one memory including computer program code, the at least one memory and the computer program code being configured to, with the at least one processing core, cause the apparatus at least to maintain a virtual space, receive at least one of sensor information, indoor positioning information and global positioning information from a smart object, determine, based on at least one of the sensor information, the indoor positioning information and the global positioning information, a location in the virtual space of a virtual space element corresponding to the smart object, and cause signals to be transmitted, the signals being configured to cause a display to display the virtual space element at the determined location in the virtual space.

Various embodiments of the second aspect may comprise at least one feature from the following bulleted list:
The apparatus according to claim 11, wherein the at least one memory and the computer program code are configured to, with the at least one processing core, cause the determining of the location in the virtual space based on the sensor information responsive to a determination, based on the sensor information, that the smart object is disposed on a physical surface
the at least one memory and the computer program code are configured to, with the at least one processing core, cause the determining of the location in the virtual space based on the indoor positioning information responsive to a determination, based on the sensor information, that the smart object is not disposed on a physical surface
the at least one memory and the computer program code are configured to, with the at least one processing core, cause the determining of the location in the virtual space based on the global positioning information responsive to a determination, based on the sensor information and the indoor positioning information, that the smart object is not disposed on a physical surface and indoor positioning is not available or not reliable the at least one memory and the computer program code are configured to, with the at least one processing core, cause the determining of the location in the virtual space based on the sensor information, the indoor positioning information and the global positioning information the virtual space comprises a multi-site virtual space According to a third aspect of the present invention, there is provided a method comprising receiving, in an apparatus, sensor information and indoor positioning information, selecting information from a group comprising the sensor information and the indoor positioning information based at least in part on a determination concerning the sensor information, and causing transmission of either the selected information, or of information derived from the selected information.

Various embodiments of the third aspect may comprise at least one feature corresponding to a feature in the preceding bulleted list laid out in connection with the first aspect.

According to a fourth aspect of the present invention, there is provided a method, comprising maintaining a virtual space, receiving at least one of sensor information, indoor positioning information and global positioning information from a smart object, determining, based on at least one of the sensor information, the indoor positioning information and the global positioning information, a location in the virtual space of a virtual space element corresponding to the smart object, and causing signals to be transmitted, the signals being configured to cause a display to display the virtual space element at the determined location in the virtual space.

Various embodiments of the fourth aspect may comprise at least one feature corresponding to a feature in the preceding bulleted list laid out in connection with the second aspect.

According to a fifth aspect of the present invention, there is provided an apparatus comprising means for receiving, in an apparatus, sensor information and indoor positioning information, means for selecting information from a group comprising the sensor information and the indoor positioning information based at least in part on a determination concerning the sensor information, and means for causing transmission of either the selected information, or of information derived from the selected information.

According to a sixth aspect of the present invention, there is provided an apparatus, comprising means for maintaining a virtual space, means for receiving at least one of sensor information, indoor positioning information and global positioning information from a smart object, means for determining, based on at least one of the sensor information, the indoor positioning information and the global positioning information, a location in the virtual space of a virtual space element corresponding to the smart object, and means for causing signals to be transmitted, the signals being configured to cause a display to display the virtual space element at the determined location in the virtual space.

According to a seventh aspect of the present invention, there is provided a non-transitory computer readable medium having stored thereon a set of computer readable instructions that, when executed by at least one processor, cause an apparatus to at least receive, in the apparatus, sensor information and indoor positioning information, select information from a group comprising the sensor information and the indoor positioning information based at least in part on a determination concerning the sensor information, and cause transmission of either the selected information, or of information derived from the selected information.

According to an eighth aspect of the present invention, there is provided a non-transitory computer readable medium having stored thereon a set of computer readable instructions that, when executed by at least one processor, cause an apparatus to at least maintain a virtual space, receive at least one of sensor information, indoor positioning information and global positioning information from a smart object, determine, based on at least one of the sensor information, the indoor positioning information and the global positioning information, a location in the virtual space of a virtual space element corresponding to the smart object, and cause signals to be transmitted, the signals being configured to cause a display to display the virtual space element at the determined location in the virtual space.

INDUSTRIAL APPLICABILITY

At least some embodiments of the present invention find industrial application in providing ways to interact with information via virtual spaces, for example in computer operating systems.

DETAILED DESCRIPTION OF EXAMPLE EMBODIMENTS

Interacting with virtual spaces may be facilitated by enabling determination of position of a device based on either a sensed position on a surface, or if that is not available, using indoor positioning. If also indoor positioning is unavailable, global positioning may be used to facilitate multi-site virtual spaces.

Figure 1:
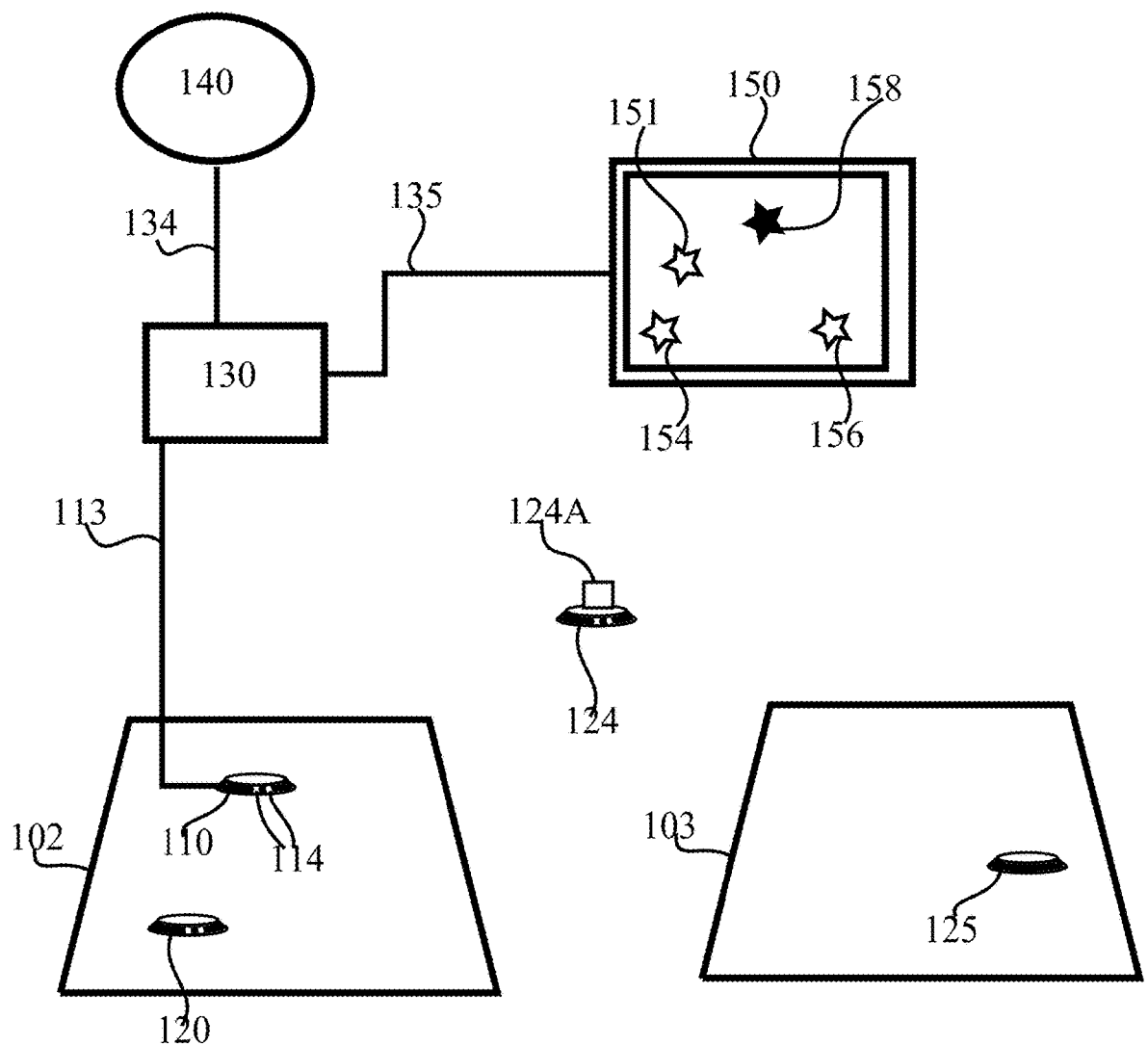
FIG. 1 illustrates an example system capable of supporting at least some embodiments of the present invention.

FIG. 1 illustrates an example system capable of supporting at least some embodiments of the present invention. Physical surface 102 may comprise, for example, a printed map or other suitable surface capable of supporting thereon device 110. Device 110 comprises a physical object capable of lying on physical surface 102, pressed against it by gravity such that physical surface 102 in turn rests on a suitable further surface or object. In case physical surface 102 is at an angle, friction between physical surface 102 and device 110 may keep device 110 stationary with respect to physical surface 102. Physical surface 103 may be of similar type to physical surface 102. The physical surfaces need not be identical, however.

Device 110 is in communication with computer 130 via connection 113. Connection 113 may be a wire-line connection, such as an Ethernet or universal serial port, USB, connection, or it may be at least in part a wireless connection, such as a Wi-Fi or Bluetooth connection, for example. Computer 130 in turn may be connected, via connection 134, to network 140. In some embodiments, network 140 is absent. Computer 130, or a device accessible via network 140, may comprise a server function that maintains a virtual space. Computer 130 is connected, via connection 135, to display 150. In some embodiments, display 150 is comprised in the same physical unit as computer 130, in which case connection 135 is internal to this physical unit. An example of such a physical unit is a tablet computer. In general a virtual space may comprise a digital representation of a metric space that is capable of containing therein virtual space elements. Virtual space elements may comprise digital representations comprising at least one characteristic. Virtual space elements may be disposed at specific locations in a virtual space. Some virtual space elements are able to move in the virtual space.

Device 110 may be configured to determine where on physical surface 102 it is located. To such end, device 110 may comprise, on a side facing physical surface 102, a sensor such as, for example, a camera arranged to image the underlying physical surface 102. Physical surface 102 may comprise printed thereon a predetermined dot, micro-dot, barcode or other suitable pattern the camera is able to detect, and device 110 may be furnished with a mapping from the pattern to a location on physical surface 102. In addition to location, an orientation of device 110 on physical surface 102 may be determinable based on sensing the pattern.

Alternatively to a camera, device 110 may employ a different kind of sensor unit to obtain sensor information enabling the determination of the location and/or orientation of device 110 on physical surface 102. For example, device 110 may comprise a near-field communication, NFC, sensor configured to detect NFC tags implanted in physical surface 102. Camera data and NFC sensing data are examples of sensor information. Sensor information may be processed to compress it, or to improve its usability for determining the location and/or orientation of device 110 on physical surface 102. Processed sensor information may also be referred to as sensor information in that it is information originating in at least one sensor, processed or otherwise.

While in the foregoing it is described that device 110 is configured to determine its location and/or orientation on physical surface 102, in some embodiments device 110 is configured to provide to computer 130 sensor information obtained by device 110 of physical surface 102, to enable computer 130 to determine the location and/or orientation of device 110 on physical surface 102. Computer 130 may provide this location and/or orientation to device 110 if this is necessary, wherein receipt of the location and/or orientation in device 110 amounts to obtaining the location and/or orientation in device 110.

Device 110 may be powered via connection 113, for example via an electrical lead comprised in an electrical cable in embodiments where connection 113 is wire-line. Alternatively or additionally, device 110 may comprise a disposable or rechargeable battery.

Device 110 may be configured to, being in possession of the location and/or orientation of device 110 on physical surface 102, derive a location and/or orientation in virtual space that corresponds to the location and/or orientation of device 110 on physical surface 102. The correspondence of the location on physical surface 102 on the one hand, and the location in the virtual space on the other hand, may be via a suitable mapping. Physical surface 102 may correspond, via the mapping, to at least part of the virtual space. The mapping may comprise use of a scale, such that, for example, a distance of 1 centimetre on physical surface 102 may correspond to a distance of one micrometre, metre, kilometre or one nautical mile, in the virtual space.

Device 110 may be configured to provide, for example to computer 130, the location and/or orientation in the virtual space that corresponds to the location and/or orientation of device 110 on physical surface 102.

After providing the location and/or orientation in the virtual space to computer 130, device 110 may obtain a second location and/or orientation of itself on physical surface 102. A user may have moved device 110 on physical surface 102, for example. Responsive to a determination, by device 110, that it has moved on physical surface 102, device 110 may provide an updated location and/or orientation in virtual space to computer 130, wherein the updated location and/or orientation in virtual space corresponds, via the mapping, to the new position and/or orientation of device 110 in physical surface 102.

Alternatively to device 110 determining the location and/or orientation in virtual space that corresponds to the location and/or orientation of device 110 on physical surface 102, computer 130 may determine this based on the sensor information provided by device 110 or based on the location and/or orientation of device 110 on physical surface 102. Computer 130 may obtain the location and/or orientation of device 110 on physical surface 102 by deriving it from the sensor information, or by receiving it from device 110, wherein device 110 may have derived it from the sensor information.

Like device 110, device 120 is disposed on physical surface 102. Device 120 may be configured to act in a similar way as device 110.

Device 125, which may be similar in form and/or type to device 110, is disposed in FIG. 1 on physical surface 103. Device 125, and device 120, may be furnished with connectivity to computer 130 via connections that connect these devices, respectively, to computer 130. For the sake of clarity, these connections are not illustrated in FIG. 1.

In FIG. 1, device 124 is not disposed on a physical surface, such as for example physical surface 102 or 103. Therefore, device 124, which may be of similar type to devices 110, 120 and 125, is not capable of obtaining sensor information of a physical surface on which it is disposed. Responsively, device 124, which may be communicatively coupled to computer 130 like devices 110, 120 and 125, may select to use indoor positioning. For example, device 124 may determine its location within a room. Device 124 may then determine, based at least in part on its location and/or orientation within the room, a location and/or orientation in the virtual space that corresponds, via the mapping, to the location and/or orientation within the room and provide it to computer 130. Alternatively, device 124 may provide the location and/or orientation within the room to enable computer 130 to determine the corresponding location and/or orientation in the virtual space. The mapping may therefore comprise a mapping from locations on physical surfaces to the virtual space, and from locations in the room to the virtual space. In some embodiments, some parts of the virtual space correspond, via the mapping, to locations on physical surfaces and other parts of the virtual space correspond, via the mapping, to locations in the room that are not on the physical surfaces.

Device 124 is illustrated as carrying smart object 124A. In general, device 124 may be associated with smart object 124A, wherein carrying the smart object is an example of association. Another example of association is where smart object 124A is placed inside device 124. To enable this, device 124 may comprise a cavity large enough to receive smart object 124A. Device 124 may be configured to report to computer 130 the location of device 124 in the room and/or in the virtual space as a location of smart object 124A. A user may associate a smart object with a device, to cause a corresponding association to occur in the virtual space. This may be useful to effect changes in the virtual space, for example where smart object 124A is associated with a "camera", or point-of-view in the virtual space, so the user may obtain views into a virtual space from within the virtual space. This may be useful when visualizing results of medical imaging or architectural models, for example. Associating may also be useful where the virtual space represents a file system, and smart object 124A is a security key unlocking access rights to a subset of files in the file system. For example, device 124 may only be allowed to interact with these files when device 124 is associated with smart object 124A. Smart object 124A may comprise a cryptographic token.

A smart object may comprise a physical object with associated information. The associated information may comprise at least one of an identity of the smart object, an identity of a virtual space element corresponding to the smart object and characteristics of the virtual space element corresponding to the smart object. A smart object may be usable in interacting with elements, such as for example files, models or games, in the virtual space.

In some embodiments, device 124 may represent a helicopter or ship in the virtual space, which in these embodiments is a game. Smart object 124A may in such embodiments represent a character or unit not capable of moving in certain sections of the virtual space unless "loaded" into another device via an association. For example, a tank may be transported over an ocean in the virtual space game when loaded into a ship. To achieve this, device 124, representing the ship in the virtual space, may comprise information that may be read by smart object 124A, representing the tank, so that it is known by smart object 124A that it is associated with device 124, and it is known by device 124 that it is associated with smart object 124A, and the virtual space may be informed accordingly that the ship is carrying the tank. Thereafter, when device 124 moves, the ship will move in the virtual space carrying the tank with it as long as the association between device 124 and smart object 124A endures.

Device 110 may comprise at least one physical button 114. Device 110 may be configured to inform computer 130 responsive to activation of physical button 114. In case device 110 comprises more than one physical button 114, device 110 may be configured to inform computer 130 which one of the physical buttons 114 was activated. Activation of a physical button may comprise that a user presses the physical button. Physical button 114 may be labelled so that the user knows what effect pressing the button will have. Alternatively to an identity of a physical button, device 110 may be configured to inform computer 130 concerning a function associated with an activated button. The physical buttons may be used by a user to interact, via device 110, 120, 124 and/or 125 with elements of the virtual space. Physical buttons may be used, for example, to cause a smart object to be associated with a device.

Computer 130 may be configured to provide to display 150 signals configured to cause display 150 to display a view into the virtual space, for example to a section of the virtual space that corresponds, via the mapping, at least in part, to physical surface 102 or 103. In FIG. 1, a virtual space element 151 corresponding to device 110 is displayed on display 150. The location of virtual space element 151 in the virtual space, and thus on display 150, may be determined, at least in part via the mapping, based on the location of device 110 on physical surface 102. In detail, the location and/or orientation of virtual space element 151 in the virtual space may correspond, via the mapping, to the location and/or orientation of device 110 on physical surface 102. Likewise, virtual space element 154 corresponds to device 120, and virtual space element 156 corresponds to device 125. Virtual space element 158 corresponds to device 124 which is not disposed in any physical surface. The location of virtual space element 158 in the virtual space is determined, as described above, using indoor positioning. In the illustrated example, virtual space element 158 is coloured black to indicate either that the corresponding device is not located on a suitable physical surface, and/or that the corresponding device is associated with a smart object. In some embodiments, computer 130 is configured to cause display 150 to indicate a nature of the association, for example by displaying a visual token corresponding to the smart object in connection with virtual space element 158.

At least one of devices 110, 120, 124 and 125 may be configured to select from a group comprising sensor information and indoor positioning information. In detail, a device may choose information to use when determining a location in the virtual space that corresponds to the location of the device. When the device is on a physical surface such as physical surface 102 or 103, that is, a physical surface with the pattern, NFC tags or other markings suitable for determining a position, the device may use the sensor information, which concerns the pattern, NFC tags or other markings to determine the location and/or orientation in virtual space. Responsive to determining that the sensor information is not usable, that is, it does not exist or does not represent a suitable pattern or markings, the device may select the indoor positioning information for determining the location and/or orientation in virtual space. For example, if the device is not disposed on a suitable physical surface, it may end up using the indoor positioning information since it has no sensor information of a suitable physical surface. In some embodiments, where the device determines both sensor information and indoor positioning information to be unusable, it may select global positioning information to determine the location and/or orientation in virtual space. This may be the case where the device is outside a room, that is, outside a range of an indoor positioning system and not on a suitable physical surface. In these cases, the mapping may comprise a mapping from global coordinates to locations in the virtual space.

Using a two-or three-tiered set of information for determining the location and/or orientation in virtual space that corresponds to a current location and/or orientation of a device in real space enables large virtual spaces to be constructed, which have potentially millimetre-range accuracy and potentially vast geographic scope. Such virtual spaces may comprise several sites with high accuracy, such high-accuracy sites corresponding, via the mapping, to physical surfaces such as physical surface 102 or 103. A virtual space comprising several sites may be referred to as a multi-site virtual space.

Figure 2:
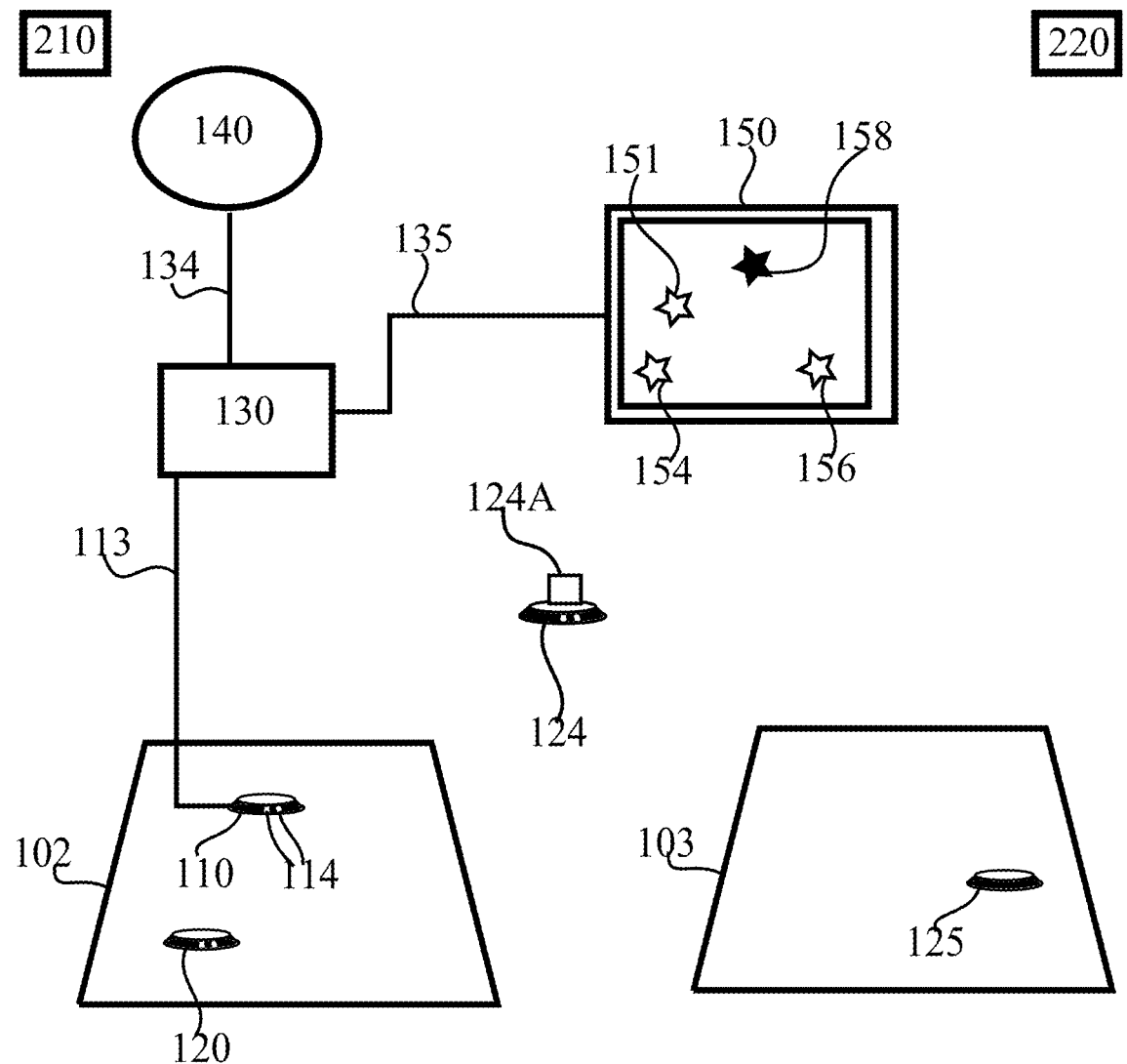
FIG. 2 illustrates an example system capable of supporting at least some embodiments of the present invention.

FIG. 2 illustrates an example system capable of supporting at least some embodiments of the present invention. FIG. 1 resembles FIG. 1, except in that FIG. 2 illustrates an indoor positioning system comprising indoor positioning nodes 210 and 220. Device 124 may be configured to receive wireless signals, such as for example radio signals, from indoor positioning nodes 210 and 220 to thereby obtain indoor positioning information. Device 124 or computer 130 may store or have access to a mapping from sets of indoor positioning information to locations in the virtual space. Alternatively or additionally the mapping from indoor positioning information to locations in the virtual space may comprise use of at least one mathematical function to obtain, based on the indoor positioning information, the corresponding location in the virtual space. The number of indoor positioning nodes in FIG. 1 is a non-limiting example, as in various embodiments the number of indoor positioning nodes may differ. In some embodiments, indoor positioning information is derived from wireless signals that are primarily used for another purpose, such as for example a wireless local area network, WLAN, network.

To obtain global positioning information, device 124 may receive signals from satellites comprised in a positioning constellation, via a satellite positioning receiver comprised in device 124, for example. In some embodiments, device 124 is capable of receiving global positioning information from smart object 124A with which device 124 is associated, for example in case device 124 lacks a satellite positioning receiver of its own.

In a first example, the virtual space corresponds to a file system, wherein a user may use a device such as device 110 to select files that are disposed in directories of the file system. One directory may correspond to one physical surface, wherein the files may be represented on display 150 as virtual space elements. A user wishing to interact with a file may move the device so that a virtual space element corresponding to the device overlaps the virtual space element representing the desired file. The user may then interact with the file, for example by using physical button 114. To interact with files in another directory, the user may move the device to another physical surface, wherein computer 130 may cause display 150 to dynamically show the virtual space element corresponding to the device move between the directories.

In a second example, the virtual space corresponds to an architectural model of a building, group of buildings, ship or another structure. The virtual space element corresponding to the device may comprise a virtual camera, which may be used to obtain views to the model by causing the virtual space element to move in the architectural model, by moving the device on and around at least one physical surface. The obtained views may comprise overlaid thereon simulated information concerning structural load factors, material stress levels and safety margin information, to assist architects in identifying weaker parts of planned buildings and to conform to local building regulations, which may vary depending on the country the buildings are planned to be built in.

In a third example, the virtual space corresponds to a game and virtual space elements corresponding to devices such as device 110, 120, 124 and 125 are characters and/or vehicles in the game. Game characters may be caused to interact with each other by moving at least one of 110, 120, 124 and 125 to a correct place, which corresponds, via the mapping, to a location in the virtual space where the interactions are to take place.

Figure 3:
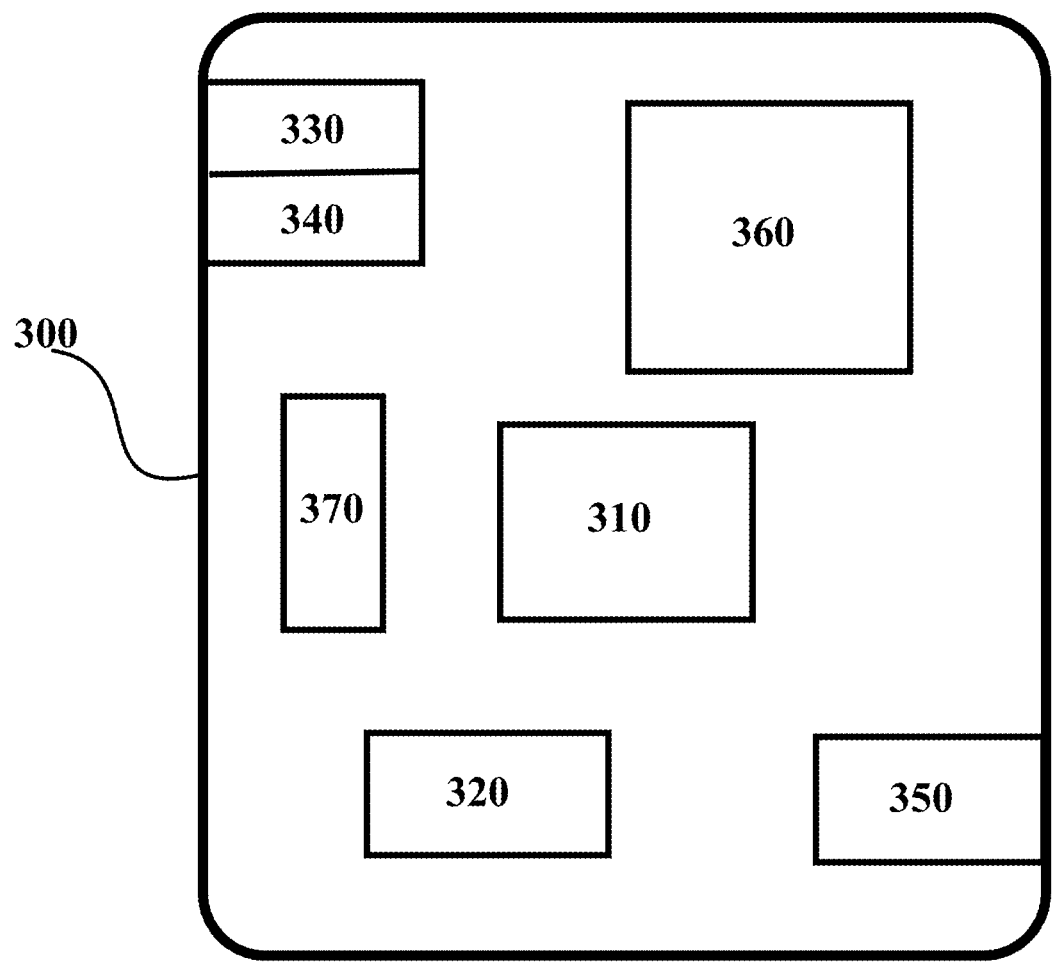
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, device 110 of FIG. 1 or FIG. 2. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and/or a microphone.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
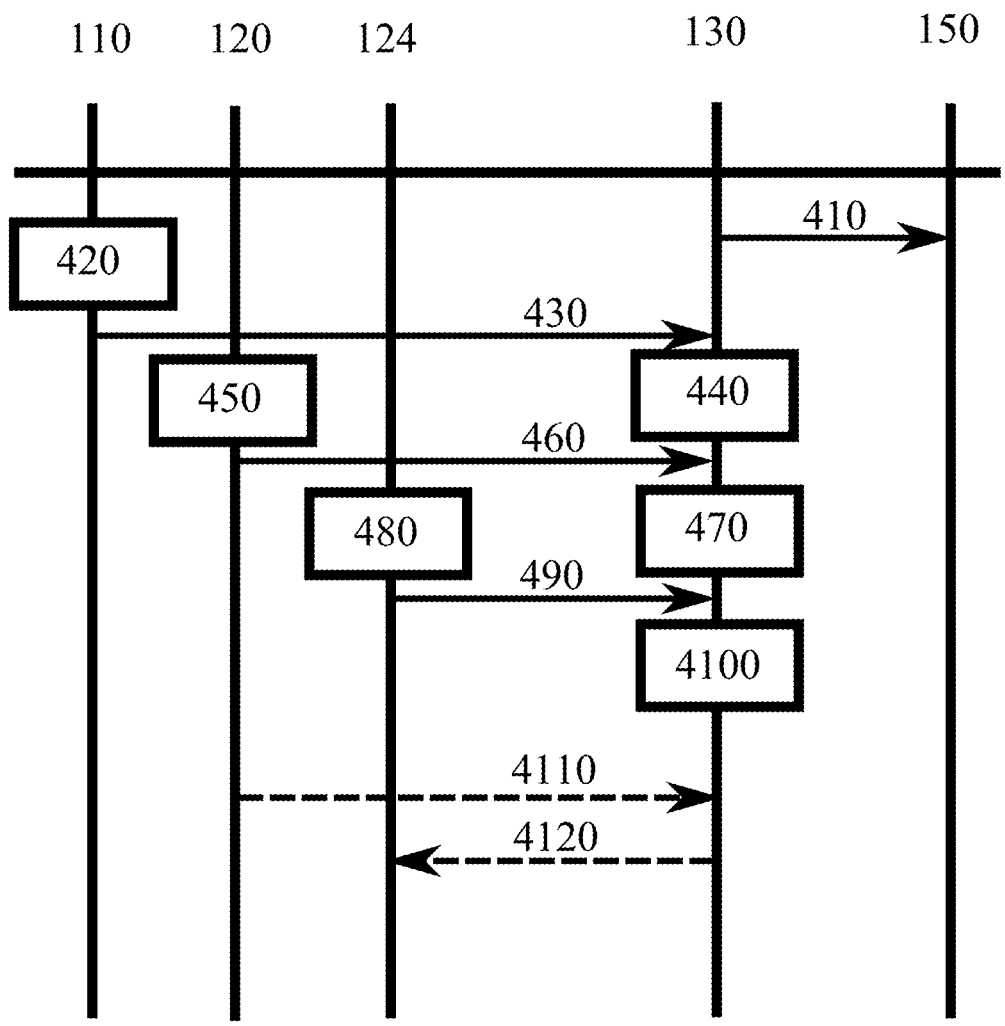
FIG. 4 illustrates signalling in accordance with at least some embodiments of the present invention.

FIG. 4 illustrates signalling in accordance with at least some embodiments of the present invention. On the vertical axes are disposed, from left to right, device 110, device 120, device 124, computer 130 and finally display 150. These entities have been described above in connection with FIG. 1. Time advances from the top toward the bottom.

In phase 410, computer 130 signals to display 150 to cause display 150 to display a view into the virtual space, wherein the virtual space may be a multi-site virtual space. The view may show a part of the virtual space or the entire virtual space. Phase 410 may be seen as a continuous phase in that computer 130 may continuously provide a video signal to display 150, the video signal being dynamically updated to reflect changes occurring in the virtual space.

In phase 420, device 110 may perform a selection of information, the selection being based at least in part on sensor information. In this example, device 110 is disposed on a physical surface that comprises a pattern suitable for determination of a location and/or orientation of device 110 on the physical surface. Device 110 determines the sensor information comprises usable information on the pattern, wherefore device 110 selects the sensor information. In phase 430, device 110 informs computer 130 of the location and/or orientation of device 110 on the physical surface, or alternatively of a location and/or orientation in the virtual space that corresponds to the location and/or orientation of device 110 on the physical surface. Device 110 performs phase 430 based at least in part on the sensor information. In phase 440, computer 130 updates the virtual space based on the information received from device 110 in phase 430.

In phase 450, device 120 may perform a selection of information, the selection being based at least in part on sensor information. In this example, device 120 is not disposed on a physical surface that comprises a pattern suitable for determination of a location and/or orientation of device 110 on the physical surface. Device 120 determines the sensor information does not comprise usable information on the pattern, wherefore device 120 selects indoor positioning information. In phase 460, device 120 informs computer 130 of the location and/or orientation of device 120, or alternatively of a location and/or orientation in the virtual space that corresponds to the location and/or orientation of device 120. Device 120 performs phase 460 based at least in part on the indoor positioning information. In phase 470, computer 130 updates the virtual space based on the information received from device 120 in phase 460.

In phase 480, device 124 may perform a selection of information, the selection being based at least in part on sensor information and indoor positioning information. In this example, device 124 is not disposed on a physical surface that comprises a pattern suitable for determination of a location and/or orientation of device 110 on the physical surface. In this example, device 124 is not in range of an indoor positioning system. Device 120 determines the sensor information does not comprise usable information on the pattern, wherefore device 120 inspects indoor positioning information. In this example, the indoor positioning information indicates that no suitable indoor positioning system is within range. Device 124 therefore selects global positioning information. In phase 490, device 124 informs computer 130 of the location and/or orientation of device 124, or alternatively of a location and/or orientation in the virtual space that corresponds to the location and/or orientation of device 124. Device 124 performs phase 490 based at least in part on the global positioning information. In phase 4100, computer 130 updates the virtual space based on the information received from device 124 in phase 490. Phases 480, 490 and 4100 are optional, since not all embodiments support using global positioning information.

In optional phase 4110, device 120 transmits a signal to computer 130, wherein the signal comprises an indication of an action to be performed in the virtual space by a virtual space element that corresponds to device 120. The action involves a virtual space element that corresponds to device 124. In optional phase 4120, computer 130 signals to device 124 concerning the action. The signal of phase 4120 may comprise an indication for device 124 to play a sound, for example. The action may comprise, for example, transmission of an email, or in a game embodiment that the virtual space element that corresponds to device 120 shoots at the virtual space element that corresponds to device 124.

Figure 5:
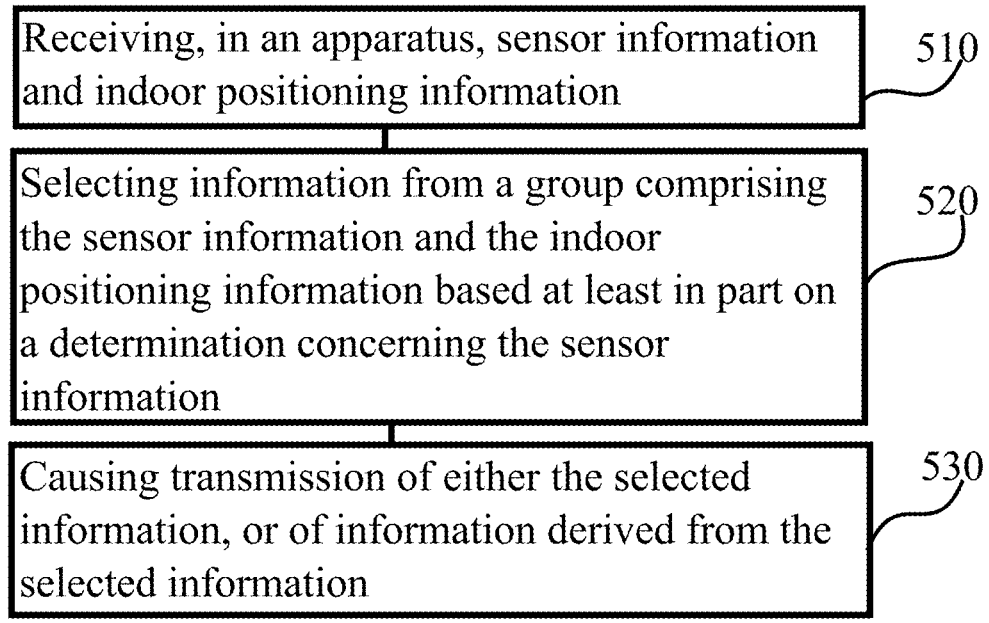
FIG. 5 is a first flow chart of a first method in accordance with at least some embodiments of the present invention.

FIG. 5 is a first flow chart of a first method in accordance with at least some embodiments of the present invention. The phases of the illustrated method may be performed in device 110, or in a control device configured to control the functioning of device 110, when implanted therein, for example. Phase 510 comprises receiving, in an apparatus, sensor information and indoor positioning information. Phase 520 comprises selecting information from a group comprising the sensor information and the indoor positioning information based at least in part on a determination concerning the sensor information. Finally, phase 530 comprises causing transmission of either the selected information, or of information derived from the selected information. Information derived from the selected information may comprise, for example, a location and/or orientation in a virtual space that corresponds to a location and/or orientation of the device performing the method. The location and/or orientation of the device performing the method may be determinable from the sensor information and/or the indoor positioning information. The determination concerning the sensor information may comprise determining whether the sensor information comprises usable information concerning a physical surface that enables determining a position and/or orientation of a device on the physical surface.

Figure 6:
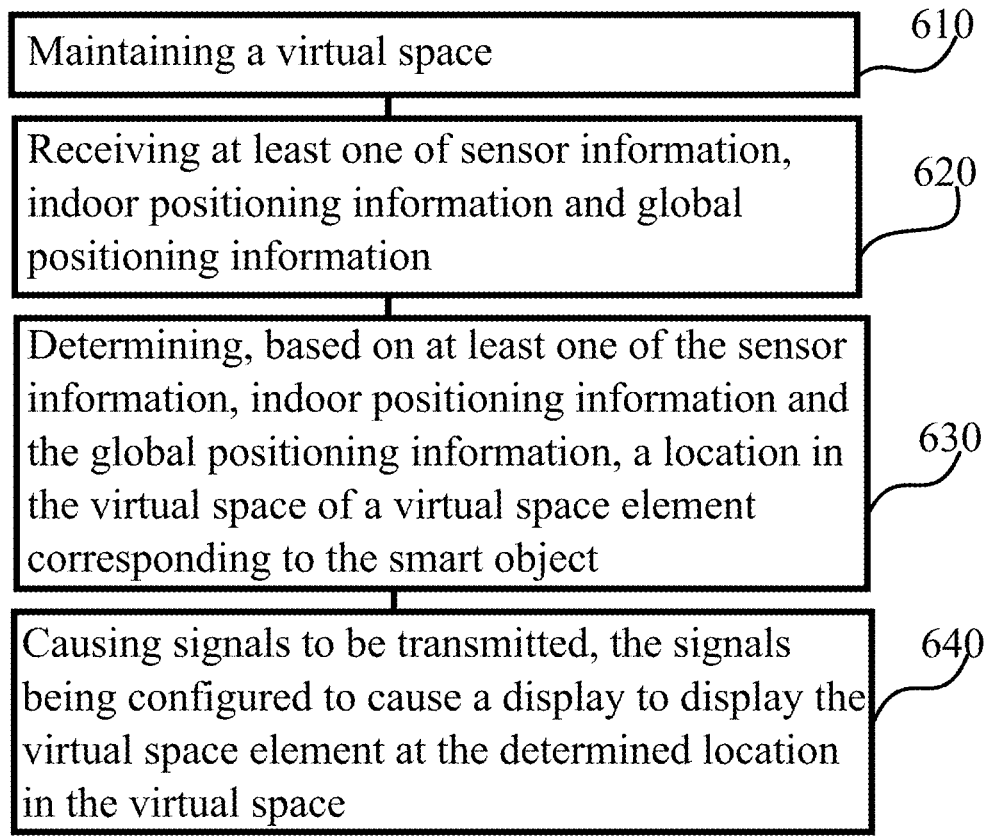
FIG. 6 is a second flow chart of a second method in accordance with at least some embodiments of the present invention.

FIG. 6 is a second flow chart of a second method in accordance with at least some embodiments of the present invention. The phases of the illustrated method may be performed in server function, in computer 130, for example. Phase 610 comprises maintaining a virtual space. Phase 620 comprises receiving at least one of sensor information, indoor positioning information and global positioning information from a smart object. Phase 630 comprises determining, based on at least one of the sensor information, the indoor positioning information and the global positioning information, a location in the virtual space of a virtual space element corresponding to the smart object. Phase 640 comprises causing signals to be transmitted, the signals being configured to cause a display to display the virtual space element at the determined location in the virtual space. Determining the location in the virtual space may be based on the sensor information in case it is determined the sensor information comprises usable information concerning a physical surface, and on the indoor positioning information or the global positioning information otherwise. Determining the location in the virtual space may be based on the indoor positioning information if it is usable and the sensor information does not comprise usable information concerning a physical surface. Determining the location in the virtual space may be based on the global positioning information if it is determined and the sensor information does not comprise usable information concerning a physical surface and that the indoor positioning information is not usable. In general determining the location in the virtual space may be based, in order of preference, firstly on the sensor information, secondly on the indoor positioning information and thirdly on global positioning information, such that the most preferred usable information is used.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising at least one processing core and at least one memory including computer program code, the at least one memory and the computer program code being configured to, with the at least one processing core, cause the apparatus at least to:
   maintain a virtual space;
   receive at least one of sensor information, indoor positioning information and global positioning information from a smart object;
   determine, based on the received sensor information, whether the apparatus is disposed on a physical surface or not;
   determine, based on at least one of the received sensor information, the received indoor positioning information and the global positioning information, a location in the virtual space of a virtual space element corresponding to the smart object, wherein the determination of a location in the virtual space comprises:
   in response to a determination that the received sensor information can be used for determining at least a location of the receiver because the apparatus is disposed on the physical surface, determining the location based only on the received sensor information;
   in response to a determination that the received sensor information cannot be used for determining at least the location of the receiver because the apparatus is not disposed on the physical surface, determining the location based only on the received indoor positioning information; and
   in response to a determination that the received sensor information and received indoor position information cannot be used, determining the location based only on the global positioning information; and
   cause signals to be transmitted, the signals being configured to cause a display to display the virtual space element at the determined location in the virtual space.

2. The apparatus according to claim 1, wherein the at least one memory and the computer program code are configured to, with the at least one processing core, cause the determining of the location in the virtual space based on the received sensor information responsive to a determination, based on the received sensor information, that the smart object is disposed on a physical surface.

3. The apparatus according to claim 1, wherein the at least one memory and the computer program code are configured to, with the at least one processing core, cause the determining of the location in the virtual space based on the received indoor positioning information responsive to a determination, based on the received sensor information, that the smart object is not disposed on a physical surface.

4. The apparatus according to claim 1, wherein the at least one memory and the computer program code are configured to, with the at least one processing core, cause the determining of the location in the virtual space based on the global positioning information responsive to a determination, based on the received sensor information and the received indoor positioning information, that the smart object is not disposed on a physical surface and indoor positioning is not available or not reliable.

5. The apparatus according to claim 1, wherein the at least one memory and the computer program code are configured to, with the at least one processing core, cause the determining of the location in the virtual space based on the received sensor information, the received indoor positioning information and the global positioning information.

6. A method, comprising:
maintaining a virtual space;
receiving at least one of sensor information, indoor positioning information and global positioning information from a smart object;
determining, based on the received sensor information, whether the apparatus is disposed on a physical surface or not;
determining, based on at least one of the received sensor information, the received indoor positioning information and the global positioning information, a location in the virtual space of a virtual space element corresponding to the smart object, wherein the determination of a location in the virtual space comprises:
in response to a determination that the received sensor information can be used for determining at least a location of the receiver because the apparatus is disposed on the physical surface, determining the location based only on the received sensor information;
in response to a determination that the received sensor information cannot be used for determining at least the location of the receiver because the apparatus is not disposed on the physical surface, determining the location based only on the received indoor positioning information; and
in response to a determination that the received sensor information and received indoor position information cannot be used, determining the location based only on the global positioning information; and
causing signals to be transmitted, the signals being configured to cause a display to display the virtual space element at the determined location in the virtual space.

7. The method according to claim 6, wherein the determining of the location in the virtual space is based on the received sensor information responsive to a determination, based on the received sensor information, that the smart object is disposed on a physical surface.

8. The method according to claim 6, wherein the determining of the location in the virtual space is based on the received indoor positioning information responsive to a determination, based on the received sensor information, that the smart object is not disposed on a physical surface.

9. The method according to claim 6, wherein the determining of the location in the virtual space is based on the global positioning information responsive to a determination, based on the received sensor information and the received indoor positioning information, that the smart object is not disposed on a physical surface and indoor positioning is not available or not reliable.

10. The method according to claim 6, wherein determining of the location in the virtual space is based on the received sensor information, the received indoor positioning information and the global positioning information.

11. The method according to claim 6, wherein maintaining the virtual space comprises maintaining a multi-site virtual space.

12. A non-transitory computer readable medium having stored thereon a set of computer readable instructions that, when executed by at least one processor, cause an apparatus to at least:
maintain a virtual space;
receive at least one of sensor information, indoor positioning information and global positioning information from a smart object;
determine, based on the received sensor information, whether the apparatus is disposed on a physical surface or not;
determine, based on at least one of the received sensor information, the received indoor positioning information and the global positioning information, a location in the virtual space of a virtual space element corresponding to the smart object, wherein the determination of a location in the virtual space comprises:
in response to a determination that the received sensor information can be used for determining at least a location of the receiver because the apparatus is disposed on the physical surface, determining the location based only on the received sensor information;
in response to a determination that the received sensor information cannot be used for determining at least the location of the receiver because the apparatus is not disposed on the physical surface, determining the location based only on the received indoor positioning information; and
in response to a determination that the received sensor information and received indoor position information cannot be used, determining the location based only on the global positioning information; and
cause signals to be transmitted, the signals being configured to cause a display to display the virtual space element at the determined location in the virtual space.

* * * * *